United States Patent
Chappell et al.

(10) Patent No.: US 6,973,096 B2
(45) Date of Patent: Dec. 6, 2005

(54) SYSTEM AND METHOD FOR PROCESSING BANDWIDTH ALLOCATION MESSAGES

(75) Inventors: Christopher L. Chappell, Chandler, AZ (US); Jeffrey D. Hoffman, Chandler, AZ (US); Dmitrii A. Loukianov, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 736 days.

(21) Appl. No.: 09/903,334

(22) Filed: Jul. 10, 2001

(65) Prior Publication Data

US 2003/0012223 A1    Jan. 16, 2003

(51) Int. Cl.$^7$ ............................. H04J 3/16; H04L 12/28
(52) U.S. Cl. ...................... 370/468; 370/389; 370/412; 370/392
(58) Field of Search ................. 370/229, 230, 370/252, 389, 392, 412, 414, 429, 432, 442, 370/443, 462, 458, 468

(56) References Cited

U.S. PATENT DOCUMENTS

| | | | | |
|---|---|---|---|---|
| 5,570,355 A | * | 10/1996 | Dail et al. ................... | 370/352 |
| 5,963,557 A | | 10/1999 | Eng | |
| 6,028,860 A | | 2/2000 | Laubach et al. | |
| 6,154,772 A | * | 11/2000 | Dunn et al. .................. | 725/114 |
| 6,377,782 B1 | * | 4/2002 | Bishop et al. .............. | 455/3.01 |
| 6,490,727 B1 | * | 12/2002 | Nazarathy et al. .......... | 725/129 |
| 6,538,656 B1 | * | 3/2003 | Cheung et al. ............. | 345/519 |
| 6,553,568 B1 | * | 4/2003 | Fijolek et al. .............. | 725/111 |
| 6,633,564 B1 | * | 10/2003 | Steer et al. .................. | 370/389 |
| 6,650,624 B1 | * | 11/2003 | Quigley et al. ............. | 370/252 |
| 6,657,983 B1 | * | 12/2003 | Surazski et al. ............ | 370/337 |

FOREIGN PATENT DOCUMENTS

EP    0774848 A2    11/1996

OTHER PUBLICATIONS

IEEE 802.16 'Broadband Wireless Access Working Group', XP-00221179, A. Aruncahalam, et al., 5 pages.
2000 IEEE, "Dynamic bandwidth allocation for the HFC DOCSIS MAC protocol", M. Droubi, et al., pp. 54-60.
2001 IEEE, "DOCSIS Cable Modem Technology", D. Fellows, et al., pp. 202-209.
Data-Over Cable Service Interface Specifications; Radio Frequency Interface Specification.

* cited by examiner

*Primary Examiner*—Hanh Nguyen
(74) *Attorney, Agent, or Firm*—Grossman, Tucker, Perreault & Pfleger, PLLC

(57) ABSTRACT

Disclosed are a system and method of processing upstream bandwidth allocation messages in a downstream management message received at a client termination device. Bandwidth allocation elements based upon selected ones of the bandwidth allocation messages are stored in a data buffer. The stored bandwidth allocation elements may be accessed from the buffer in response to a validation of a cyclic redundancy code in the downstream management message.

25 Claims, 7 Drawing Sheets

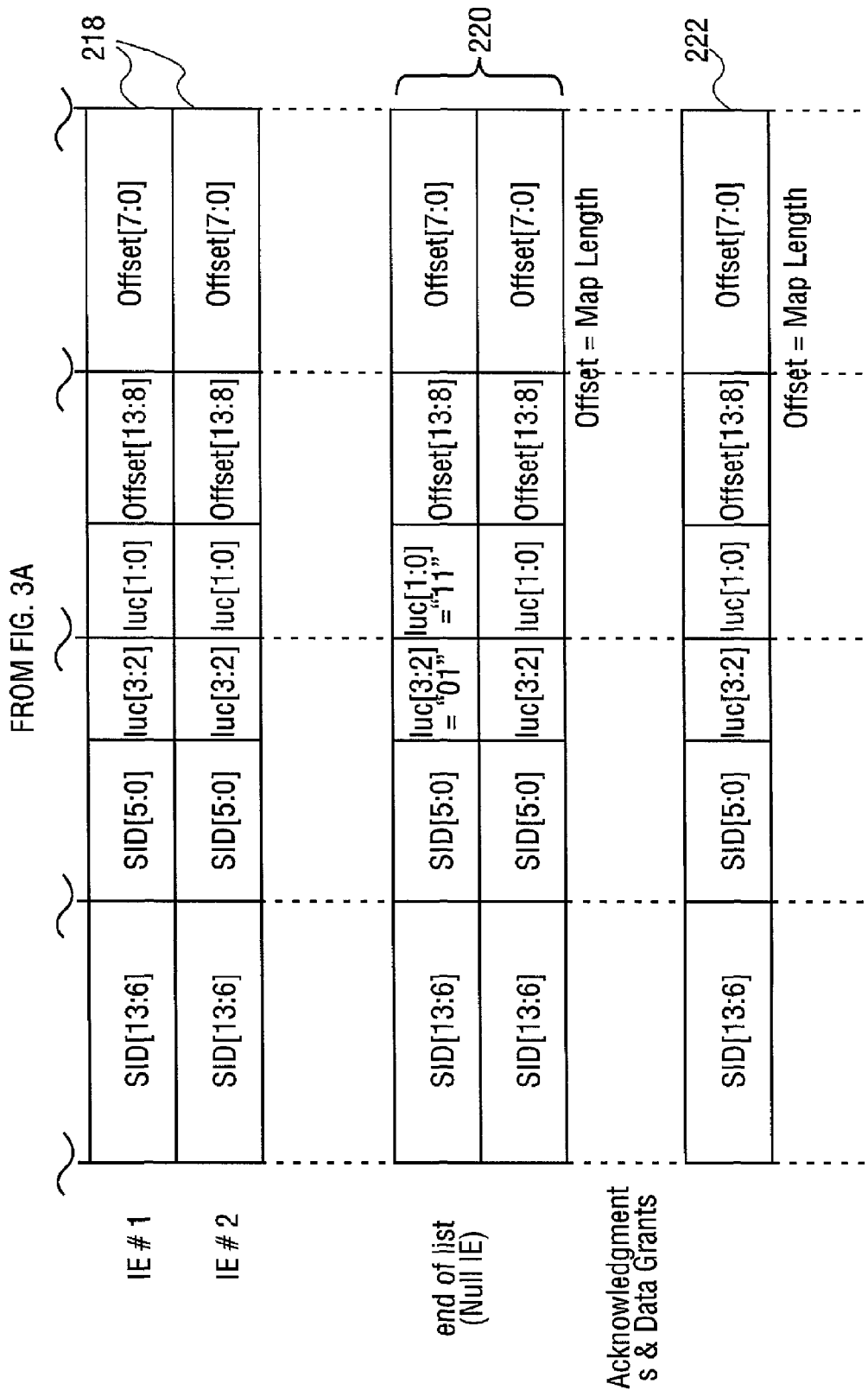

SYSTEM AND METHOD FOR PROCESSING BANDWIDTH ALLOCATION MESSAGES

BACKGROUND

1. Field

The disclosure herein relates to data communication systems. In particular, aspects of this disclosure relate to data communication to a client termination device.

2. Information

Cable networks typically enable network subscribers to received data services through a client termination device associated with a cable modem (CM). A cable modem termination system (CMTS) typically provides headend coupled to a plurality of CMs through a common transmission medium such as a coaxial cable. A CMTS is typically capable of transmitting packetized data to and receiving packetized data from CMs according to a data transmission protocol.

Resources to transmit data to a CMTS from two or more CMs coupled to the CMTS are typically shared among the CMs. A shared transmission medium may comprise an "upstream" passband in the transmission medium that is shared among the CMs according to a time division multiple access (TDMA) allocation scheme. For example, CMs may request an allocation of time for the transmission of data in the upstream passband. In response, the CMTS may broadcast messages to the CMs indicating the status of requests for such resources. The CMs may then receive and process the broadcast messages to determine the status of these requests and schedule the transmission of data to the CMTS.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

FIGS. 3a and 3b show a schematic diagram illustrating an encapsulation of upstream bandwidth allocation messages encapsulated within a downstream management message according to an embodiment of the present invention.

DETAILED DESCRIPTION

Figure 1:
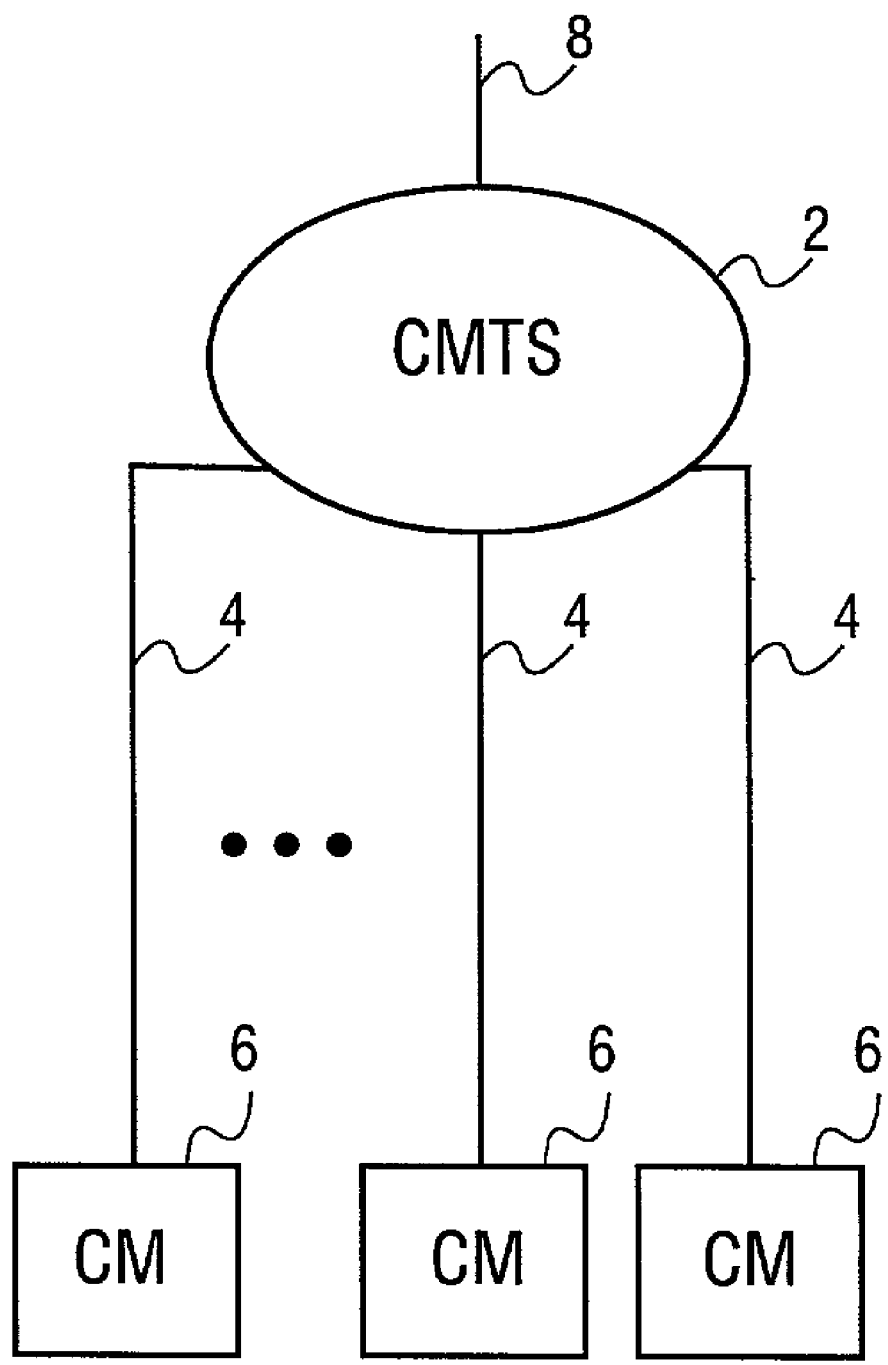
FIG. 1 shows schematic diagram of a data transmission network according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise processing circuitry in combination with machine-executable instructions stored in a memory. However, these are merely examples of structures which may provide logic and embodiments of the present invention are not limited in these respects.

A "processing system" as discussed herein relates to a combination of hardware and software resources for accomplishing computational tasks. However, embodiments of the present invention are not limited in this respect. A "host processing system" relates to a processing system which may be adapted to communicate with a "peripheral device." For example, a peripheral device may provide inputs to or receive outputs from an application process hosted on the host processing system. However, embodiments of the present invention are not limited in this respect.

A "data bus" as referred to herein relates to circuitry for transmitting data between devices. For example, a data bus may transmit data between a host processing system and a peripheral device. However, this is merely an example of a data bus and embodiments of the present invention are not limited in this respect. A "bus transaction" as referred to herein relates to an interaction between or among devices coupled in a bus structure wherein one device transmits data addressed to the other device through the bus structure.

A "shared memory" as referred to herein relates to a portion of memory which is accessible by more than one device. A shared memory may be accessible by multiple processing systems or devices in a processing platform. For example, a processing system may store data in a shared memory which is to be processed by device having access to the shared memory. In another example, a shared memory may be formed in an embedded processing structure such that portions of the memory are accessible by more than one device coupled to an internal data bus. However, these are merely examples of a shared memory and embodiments of the present invention are not limited in these respects.

A data bus may transfer data between or among devices or bus agents in a processing platform using a "direct memory access" (DMA) transaction through which data may be transferred in the data bus independently of one or more processes hosted on a processing system. For example, a device coupled to a data bus structure may act as a bus master to initiate bus transactions to store or retrieve data in memory. However, these are merely an example of DMA systems and DMA transactions, and embodiments of the present invention are not limited in these respects.

A "transmission medium" as referred to herein relates to any media suitable for transmitting data. A transmission medium may include any one of several mediums including, for example transmission cabling, optical transmission medium or wireless transmission media. However, these are merely examples of transmission media and embodiments of the present invention are not limited in this respect.

A "client termination device" as referred to herein relates to a device capable of processing data received from a transmission medium. A client termination device may comprise logic to initiate the transmission of data in a transmission medium. A client termination device may also comprise logic to process data transmitted in a transmission medium in a format according to the Data Over Cable Service Interface Specification, Radio Frequency Interface Specification Rev. 1.1 published by CableLabs®, Inc., 2000 (SP-RFIv1.1-106-001215) (hereinafter "DOCSIS"). However, these are merely examples of a client termination device and embodiments of the present invention are not limited in these respects.

A "cyclic redundancy code" (CRC) as referred to herein relates to a set of bits combined with digital data in a data transmission message. At a receiving point for the data transmission message, a predefined "validating" operation may be performed on a CRC to indicate the reliability of digital data in a received data transmission message. However, this is merely an example of a CRC and an operation to validate a data transmission from a CRC, and embodiments of the present invention are not limited in these respects.

A "downstream management message" as referred to herein relates to data messages transmitted to client termination devices through a transmission medium. A downstream management message may comprise information to facilitate communication between client termination devices and a headend device according to a communication protocol such as communication protocols provided in DOCSIS. Also, a downstream management message may be broadcasted to more than one client termination device. However, this is merely an example of a downstream management message and embodiments of the present invention are not limited in these respects.

A downstream management message may comprise a header portion and a payload portion. The header portion may comprise a set of bits as a "header check sequence" (HCS). An HCS may comprise a CRC for validation of a received downstream management message. However, this is merely an example of an HCS and embodiments of the present invention are not limited in this respect.

A "bandwidth allocation element" as referred to herein relates to data transmissions containing data representative of an allocation of resources to one or more client termination devices messages for the transmission of data in a transmission medium toward a headend. An upstream bandwidth allocation element may indicate discrete time slots allocated to a client termination device for the transmission of data toward a headend. Alternatively, an upstream bandwidth allocation element may acknowledge receipt of a request for a resource to transmit data toward a headend. Also, more than one upstream bandwidth allocation message may be encapsulated in a single downstream management message. However, these are merely examples of a bandwidth allocation element and embodiments of the present invention are not limited in this respect. "Service identifier information" as referred to herein relates to information in an upstream bandwidth allocation message which indicates a recipient for the upstream bandwidth allocation message.

"Bandwidth allocation information" as referred to herein relates to information identifying a status of a bandwidth allocation request. For example, bandwidth allocation information may comprise information extracted from an upstream bandwidth allocation information. Such information may represent an allocation of a resource to transmit data to a headend through a shared transmission medium. However, these are merely examples of bandwidth allocation information and embodiments of the present invention are not limited in this respect.

Briefly, an embodiment of the present invention is directed to a system and method of processing upstream bandwidth allocation elements in a downstream management message received at a client termination device. Bandwidth allocation information based upon selected ones of the bandwidth allocation elements are stored in a data buffer. The stored bandwidth allocation information may be outputted from the buffer in response to a validation of a CRC in the downstream management message. However, this is merely an example embodiment of the present invention and other embodiments are not limited in these respects.

FIG. 1 shows schematic diagram of a data transmission network according to an embodiment of the present invention. A cable modem termination system (CMTS) 2 is coupled through transmission mediums 4 to a plurality of client termination devices comprising cable modems (CMs) 6. Data packets may be transmitted between CMTS 2 and the CMs 6 according to DOCSIS. A transmission medium 4 may comprise one or a combination of transmission media types include coaxial cabling, twisted pair transmission medium, wireless transmission media, or optical transmission media. The transmission medium 4 may transmit "downstream" data packets from the CMTS 2 to the CMs 6 in a downstream passband and transmit "upstream" data packets from the CMs 6 to the CMTS 2 in an upstream passband. However, this is merely an example of how data may be transmitted between a headend and one or more client termination devices, and embodiments of the present invention are not limited in this respect.

In the illustrated embodiment, the CMTS 2 may transmit broadcast data packets or unicast data packets to one or more of the CMs 6 according to a data transmission protocol. Access to an upstream data channel for transmitting data packets to the CMTS 2 from the CMs 6 may be shared among the CMs 6. The upstream passband in the transmission medium 4 for transmitting data packets to the CMTS 2 may be allocated among the CMs 6 according to a time division multiple access (TDMA) scheme. For example, access to the upstream passband may be partitioned into discrete time slots allocated among the CMs 6. A CM 6 having data to transmit to the CMTS 2 may then contend with other CMs 6 for an allocation of one or more of the time slots. However, this is merely an example of how portions of an upstream data channel may be allocated among multiple entities and embodiments of the present invention are not limited in these respects.

Figure 2:
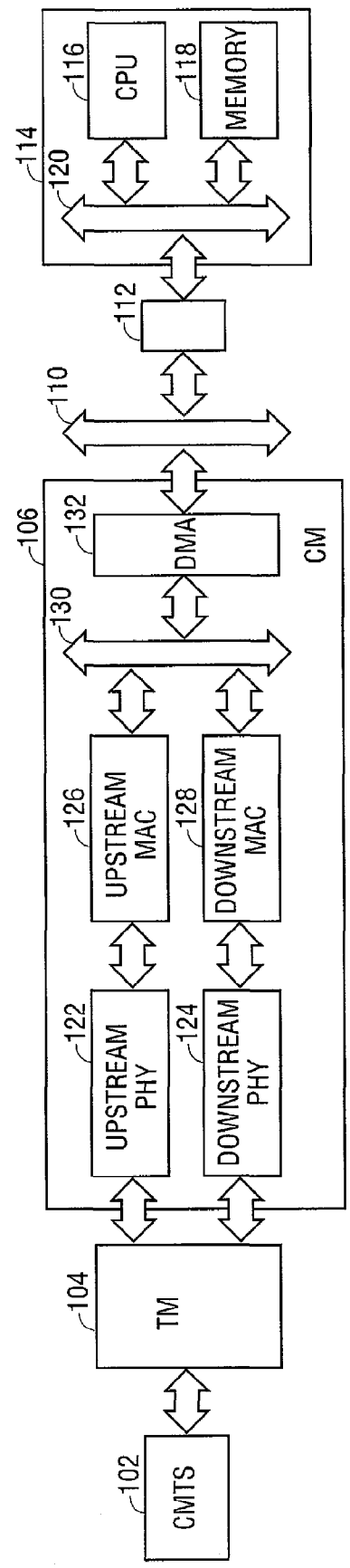
FIG. 2 shows a schematic diagram of a client termination device according to an embodiment of the present invention shown in FIG. 1.

FIG. 2 shows a schematic diagram of a client termination device according to an embodiment of the present invention shown in FIG. 1. A client termination device may comprise a CM 106 and a host processing system 114 coupled by a data bus 110 and a bridge 112. The CM 106 may be coupled to a CMTS 102 through a transmission medium 104. However, this is merely an example of how a client termination device may be coupled to a CMTS through a transmission medium and embodiments of the present invention are not limited in this respect.

The CMTS 102 may transmit packetized data to the CM 106 in a downstream passband of the transmission medium 104 while the CM 106 may transmit packetized data to the CMTS 102 in an upstream passband of the transmission medium 104. The CM 106 comprises a downstream physical communication circuit 124 coupled to the transmission medium to data signals transmitted on the downstream passband. A downstream media access control (MAC) circuit 128 may then extract data packets received on the downsteam passband which are addressed to the client termination device. Similarly, the CM 106 comprises an upstream MAC circuit 126 for initiating the transmission of data packets to the CMTS 102. An upstream physical communication circuit 122 coupled to the upstream passband of the transmission medium 104 may transmit data packets from the upstream MAC circuit 126 to the CMTS 102 through the upstream passband. However, this is merely an example of how data may be transmitted between a CM and a CMTS, and embodiments of the present invention are not limited in this respect.

The host processing system 114 may comprise a central processing unit (CPU) 116 coupled to a memory 118 through a system bus 120. The CM 106 may be coupled to the host processing system 114 as a peripheral device such that the CM 106 transmits data between the CMTS 102 and application programs hosted on the host processing system 114. The CM 106 may comprise a DMA circuit 132 to initiate DMA transactions on the data bus 110 to transmit data between the host processing system 114 and the CM 106. However, this is merely an example of how a host processing system may be integrated with a client termination device and embodiments of the present invention are not limited in this respect.

The CM 106 may comprise an upstream message processor or controller (not shown) which is adapted to process upstream bandwidth allocation information received from the CMTS 102. The upstream message processor or controller may be formed within the downstream MAC 128. Alternatively, the upstream message processor or controller may be disposed between a downstream MAC and a data bus. However, these are merely examples of how logic to process bandwidth allocation information may be disposed within a CM and embodiments of the present invention are not limited in these respects. The upstream message processor or controller may process bandwidth allocation information derived from bandwidth allocation elements indicating time slots in the upstream passband which are allocated to the CM for the transmission of data packets to the CMTS 102. The upstream message processor or controller may then schedule the transmission of queued messages in the upstream passband to the CMTS 102 through the upstream MAC circuit 126 and upstream physical communication circuit 122.

Figure 3A:
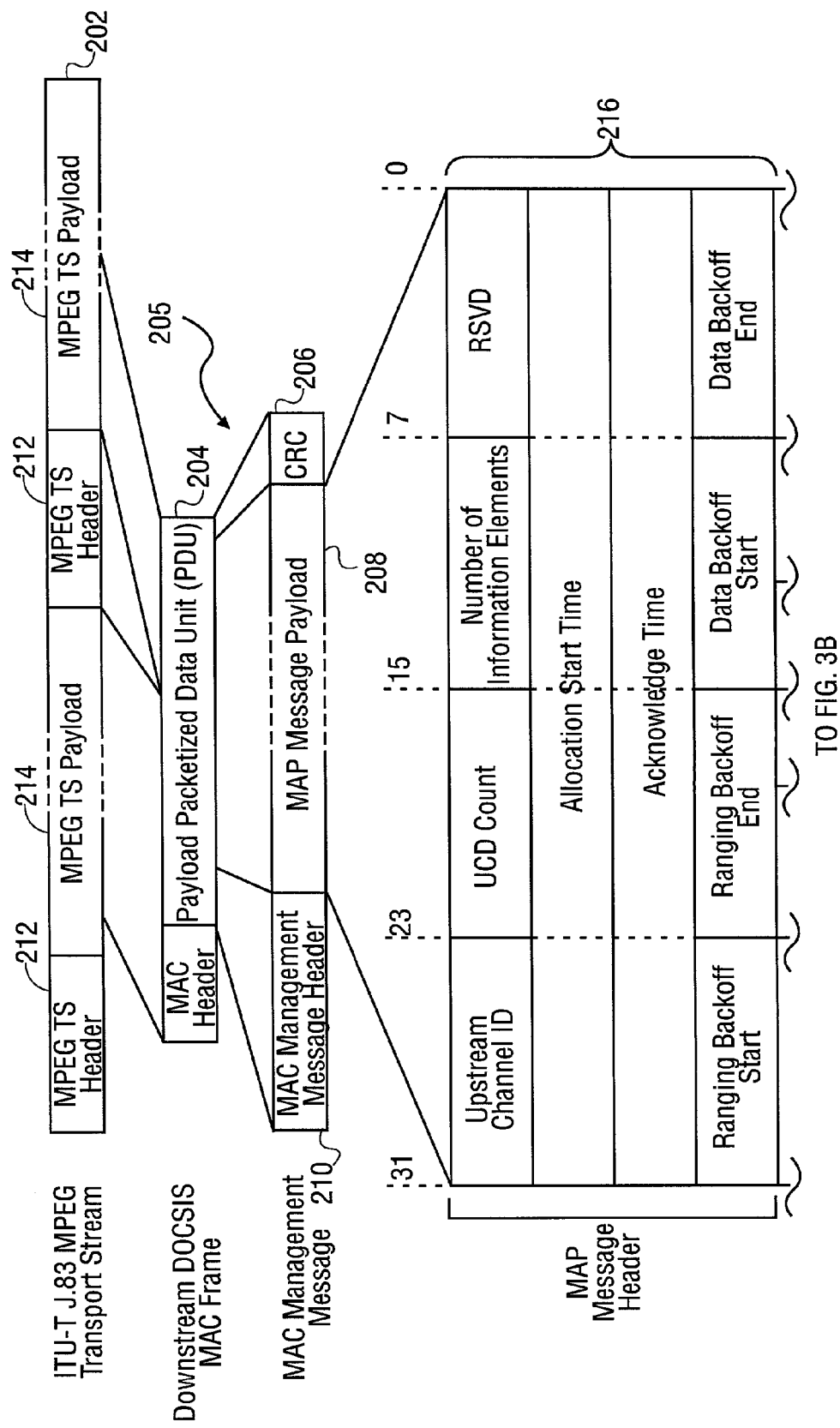

FIGS. 3a and 3b show a schematic diagram illustrating upstream bandwidth allocation elements encapsulated within a downstream management message according to an embodiment of the present invention. According to an embodiment of the CM 106 shown in FIG. 2, the downstream physical communication circuit 124 may transmit a data stream 202 to the downstream MAC circuit 128 in response to signals received from the CMTS 106 through the transmission medium 104. The data stream 202 may comprise a series of MPEG data frames formatted according to International Telecommunication Recommendation TTU-T J.83 where each MPEG data frame comprises a header 212 and payload 214. The payload 214 of one or more MPEG data frames may encapsulate a downstream DOCSIS MAC frame 204. A downstream DOCSIS MAC frame may have a payload comprising a MAC management message 205.

The MAC management message 205 may comprise a MAC management header 210, a message payload 208 and a CRC 206. The message payload 208 may comprise a plurality of 32-bit words. These 32-bit words may comprise bandwidth allocation elements (MAPs) such as data grant MAP elements 218 and data grant pending MAP elements 222, and a MAP Message Header 216. In the illustrated embodiment, the data grant MAP elements 218 may indicate an allocation of a data transmission resource in an upstream passband for a time in the future. Also, the data grant MAP elements 222 may indicate an acknowledgement of a previous request for a data transmission resource which has not been granted in the current MAC Management Message 205.

The MAC management message 205 may be broadcasted to two or more CMs coupled to a CMTS through a transmission medium. Each of the MAP elements 218 and 222 comprise a bit field (e.g., fourteen bits) for a service identifier (SID) indicating a destination for the MAP. For an associated MAP element, an SID may indicate either single or multiple destinations for a MAP element. Accordingly, CMs receiving the MAC management message 205 may selectively process MAP elements encapsulated in the payload 208 based upon the SIDs associated with the MAP elements. However, this is merely an example of how a CM may selectively process MAP elements encapsulated in a MAC management message and embodiments of the present invention are not limited in this respect.

Figure 4:
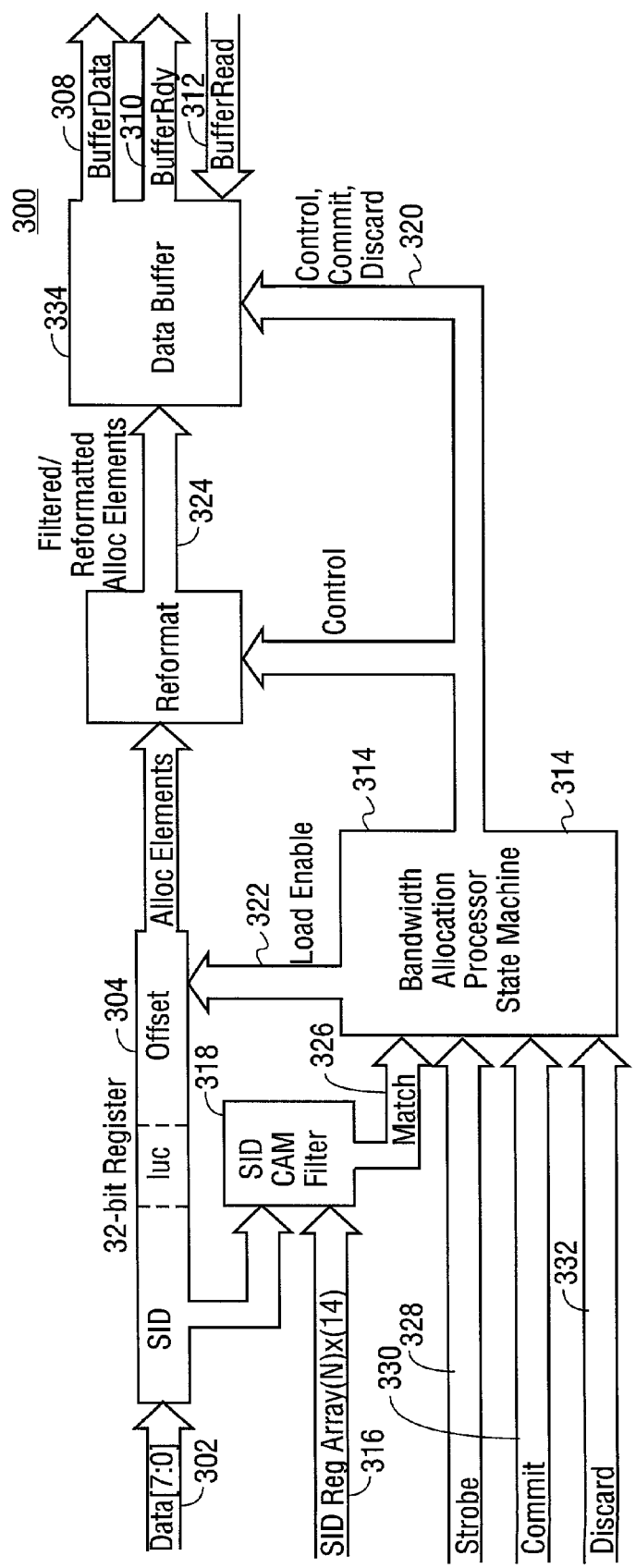
FIG. 4 shows a schematic diagram of logic for processing upstream bandwidth allocation messages according to an embodiment of the present invention shown in FIG. 2.

FIG. 4 shows a schematic diagram of logic 300 for processing portions of a MAC Management message according to an embodiment of the present invention shown in FIG. 2. According to an embodiment, the logic 300 may reside in a downstream MAC circuit of a CM and provide bandwidth allocation information as an output to an upstream message processor or controller. However, this is merely an example of how logic for processing bandwidth allocation messages may be implemented in a CM and embodiments of the present invention are not limited in this respect.

In an embodiment illustrated with reference to FIGS. 3a and 3b, the MAC Management Message Header 210 of MAC Management Message 205 may comprise a series of CRC bits as a header check sequence (HCS). Accordingly, logic in a downstream MAC may validate the HCS prior to forwarding the MAP Message Payload 208 for processing as illustrated by example with reference to FIG. 4.

In the illustrated embodiment, a 32-bit shift register 304 receives an 8-bit wide data stream from portions of a MAP Management message. For example, the register 304 may receive data from a MAP Message Payload such as MAP Message Payload 208 (FIG. 3). The shift register 304 may receive 32-bit words in 8-bytes. Four 32-bit words of a MAP Message Header such as MAP Message Header 216 may be initially loaded to the shift register 304 before being forwarded to the data buffer 334. Then, 32-bit words comprising data grant MAP elements (such as data grant MAP elements 218) and data grant pending MAP elements (such as data grant pending MAP elements 222) may be sequentially loaded to the shift register 304 for processing as illustrated below.

Once a MAP element is loaded to the shift register 304, an SID filter 318 may determine whether the SID in the loaded MAP element identifies the CM as a destination for the MAP element. The SID filter 318 may receive data 316 which identifies a set of unicast SID values associated with a particular CM, and may be programmed from a host processing system (e.g., host processing system 114). The SID filter 318 may then determine whether the MAP element loaded to the register 304 has a destination associated with the host CM and provide data 326 to a bandwidth allocation processor state machine (BAPSM) 314 indicating a match.

A downstream MAC circuit may comprise CRC validation logic (not shown) to validate a CRC in a MAC management message such as the CRC 206 of the MAC management message 205. In the illustrated embodiment, the BAPSM 314 comprises logic to determine whether a MAP element loaded to the register 304 is to be processed by an upstream message processor or controller based upon whether the MAP element has a destination associated with the host CM and whether the CRC 206 is valid. If the MAP loaded to the register 304 comprises a destination associated with the host CM, the BAPSM 314 initiates the loading of bandwidth allocation information based upon the MAP element to a first-in-first-out (FIFO) data buffer 334. One or more MAP elements encapsulated in the payload of a MAC Management Message may comprise a destination associated with the host CM and be stored in the FIFO data buffer 334 in response to the data 322.

Upon receiving data indicating a validation of the CRC 206 from CRC validation logic, the BAPSM 314 may generate a "commit" signal on bus 320 to cause data stored in the FIFO data buffer 334 to be outputted to an upstream message processor or controller. Upon receiving data from the CRC validation circuit indicating that the CRC 206 is invalid, the BAPSM 314 may cause data stored in the FIFO data buffer 334 to be discarded by generating a "discard" signal on bus 320. Accordingly, MAPs encapsulated in the payload of a MAC Management Message are filtered to selectively provide bandwidth allocation information to the upstream message processor or controller upon detection of a validation of the CRC 206. However, this is merely an example of selectively providing data to an upstream message processor or controller and embodiments of the present invention are not limited in this respect.

According to an embodiment of the present invention, the logic 300 maintains a "temporary" write pointer, "permanent" write pointer and a read pointer associated with address locations in the data buffer 334 for storing data received from the reformat section 306. As data is stored in the data buffer 334 in one location, the temporary write pointer may be advanced to the next available location. Thus, the temporary write pointer may be advanced until all MAP elements in a MAC Management Message are processed to provide data from a MAP Message Header and corresponding bandwidth allocation information in the data buffer 334. If a CRC of the MAC Management Message is validated at the end of storing the bandwidth allocation information in the data buffer 334 (i.e., causing a "commit" signal on bus 320), the permanent write pointer may be advanced to the position of the temporary write pointer. Otherwise, if the CRC is determined to be invalid (i.e., causing a "discard" signal on bus 320), the temporary write pointer may be returned to the position of the permanent write pointer so that a new MAP Message Header and bandwidth allocation information may be written over the locations of the "discarded" MAP Message Header and bandwidth allocation information. The read pointer may then be prevented from advancing beyond the position of the permanent write pointer to ensure that bandwidth allocation information is not forwarded to the upstream message processor or controller until a corresponding CRC is validated. This may be implemented by generating a FIFO empty condition on the BufferRdy signal 310. However, this is merely an example of how a buffer may be controlled to selectively output data upon the validation a CRC and embodiments of the present invention are not limited in this respect.

According to an embodiment of the present invention, a reformat section 306 comprises logic to extract information from MAP elements loaded to the register 304 to provide bandwidth allocation information. The reformat section 306 may then atomically organize the bandwidth allocation information in the data buffer 334. The bandwidth allocation information may be formatted in the data buffer 334 such that bandwidth allocation information derived from individual bandwidth allocation elements may be retrieved from the data buffer 334 and processed by an upstream message processor or controller upon advance of the read pointer. For example, bandwidth allocation information stored in the data buffer 334 may comprise selected portions (e.g., selected fields) of corresponding MAP elements. Alternatively, the bandwidth allocation information stored in the data buffer 334 may comprise reformatted information derived from the corresponding MAP elements. However, this is merely an example of how bandwidth allocation information may be formatted in a data buffer and embodiments of the present invention are not limited in this respect.

Figure 5:
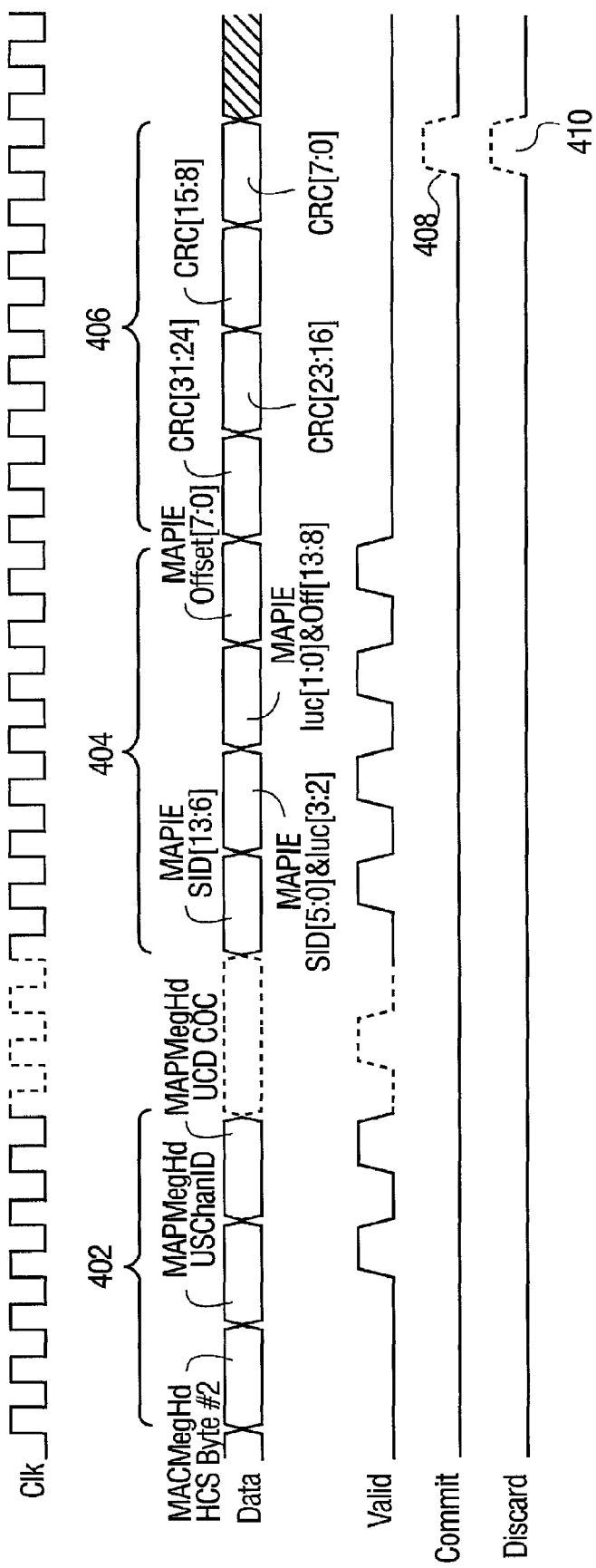
FIG. 5 shows a schematic diagram of the timing of signals to logic for processing upstream bandwidth allocation messages according to an embodiment of the present invention shown in FIG. 4.

FIG. 5 shows a schematic diagram of the timing of signals for processing portions of a MAC Management Message according to an embodiment of the present invention shown in FIG. 4. A data signal comprises bytes 402 of a MAP Message Header, bytes 404 of one or more MAP elements and bytes 406 of a CRC. According to an embodiment of the system shown in FIG. 4, a MAC Management Message Header is removed prior to loading data from the MAC Message Payload to the register 304. The bytes 402 may then be sequentially loaded to the register 304 while the BAPSM 314 permits the storage of the bytes 402 of the MAP Message Header to the data buffer 334 at a location indicated by the temporary write pointer. The bytes 404 may then be sequentially loaded to the register 304 for SID filtering at SID filter 318 and reformatting at reformatter 306 to provide bandwidth allocation information for storage in the data buffer 334 at a location indicated by the temporary write pointer. CRC validation logic may then process bytes 406 to initiate a commit signal 408 to initiate advancing the permanent write pointer to the temporary write pointer, or initiate a discard signal 410 to initiate returning the temporary write pointer to the permanent write pointer. However, this is merely an example of sequentially processing bytes of a MAC Management message and embodiments of the present invention are not limited in this respect.

According to an embodiment, the logic 300 may reserve one or more locations in the data buffer 334 between the stored MAP Message Header and any subsequently stored bandwidth allocation information. Upon completion of storing data from the bytes 402 in the data buffer 334, the temporary write pointer may be advanced two or more data buffer locations before storing bandwidth allocation information in the data buffer 334 to result in one or more unwritten locations between the MAP Message Header and the bandwidth allocation information. The BAPSM 314 may then store additional information in the unwritten locations after processing the MAP elements. However, this is merely an example of how locations in a FIFO data buffer may be reserved for a write back operation and embodiments of the present invention are not limited in this respect.

According to an embodiment, the logic 300 may write back data to locations in the data buffer 334 after processing some or all of the MAP elements. For example, the logic 300 may count the number of grants allocated to one or more particular unicast SIDs from a single MAC Management Message (e.g., MAP elements in MAP Message payload 208, FIG. 3). However, the logic 300 may store other information after an initial processing of MAP elements in a MAC Management Message and embodiments of the present invention are not limited in this respect. This information written back may comprise statistical information derived from the processed bandwidth allocation elements. Such statistical information written to the data buffer in front of the bandwidth allocation information may enable an upstream message processor (or controller to more efficiently process the bandwidth allocation information. However, this is merely an example of information which may be written back to a reserved portion of a FIFO buffer following a processing of MAP elements in a MAC Management Message and embodiments of the present invention are not limited in this respect.

Figure 6:
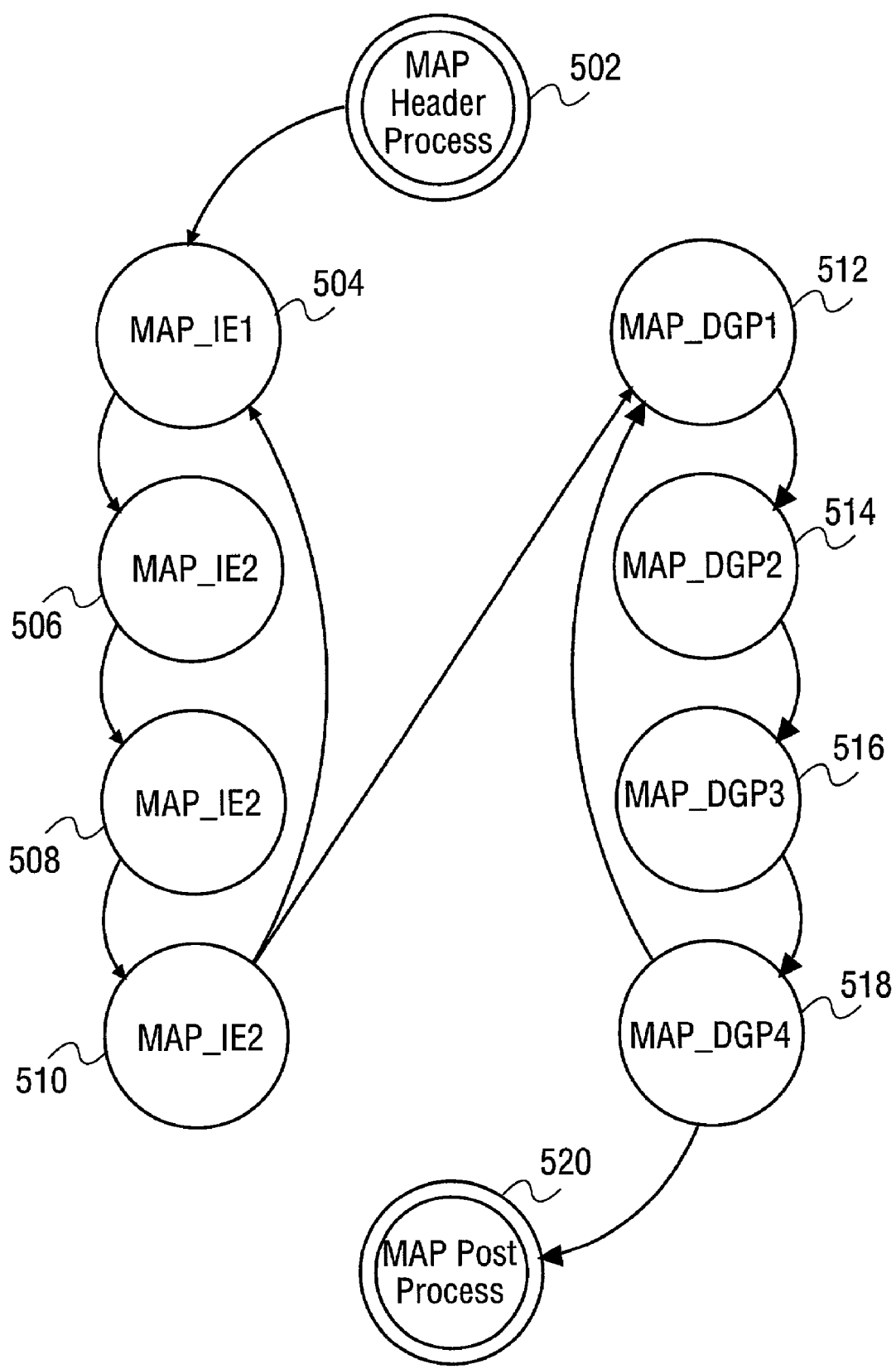
FIG. 6 shows a flow diagram illustrating state transitions in a bandwidth allocation state machine processor according to an embodiment of the present invention shown in FIG. 4.

FIG. 6 shows a flow diagram illustrating state transitions in a bandwidth allocation state machine processor according to an embodiment of the present invention shown in FIG. 4. Bubble 502 represents processing of a MAP Management Message Header to store information from a the MAP Management Message Header in a data buffer. Bubbles 504 through 510 represent reading in successive bytes of one or more grant MAP elements and writing any associated bandwidth allocation information to the data buffer. Processing returns from bubble 510 to bubble 504 following the processing of each grant MAP element until all grant MAP elements have been processed. Bubbles 512 through 518 represent reading in successive bytes of a data grant pending MAP element and writing any associated bandwidth allocation information to the data buffer. Processing returns from bubble 518 to bubble 512 until all grant pending MAP elements have been processed.

Upon completion of processing the last grant pending MAP element at bubble 518, the bandwidth allocation state machine processor may process statistical information derived from the bandwidth allocation message to provide additional information to be written to the data buffer as discussed above. Then, upon detection of a valid CRC, the bandwidth allocation state machine processor may then release the data stored in the data buffer for processing.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:
   receiving a downstream management message at a client termination device, the client termination device comprising a data buffer, the downstream management message comprising one or more bandwidth allocation elements and a cyclic redundancy code (CRC);
   storing bandwidth allocation information based upon selected ones of the bandwidth allocation elements in the data buffer;
   outputting the stored bandwidth allocation information from the data buffer in response to detecting a validation of the CRC;
   storing message header data in one or more first locations in a first-in-first-out (FIFO) data buffer, the message header data being based upon a message header in the downstream management message;
   storing the bandwidth allocation information in subsequent locations in the FIFO data buffer;
   storing the message header data in the FIFO data buffer at locations indicated by a write pointer;
   advancing the write pointer to one or more of the subsequent locations;
   storing the bandwidth allocation information in the subsequent locations; and
   upon completion of storing the bandwidth information in the subsequent locations, storing data in the FIFO data buffer between the first locations and the subsequent locations.

2. The method of claim 1, wherein the method further comprises:
   associating one or more bandwidth allocation elements with the client termination device based upon service identifier information; and
   for each bandwidth allocation element associated with the client termination device, storing bandwidth allocation information based upon the bandwidth allocation element in the data buffer.

3. The method of claim 1, wherein the method further comprises:
   sequentially storing bandwidth allocation information based upon one or more bandwidth allocation elements in a first-in-first-out data buffer at locations indicated by a write pointer;
   advancing the write pointer after storing bandwidth allocation information for each bandwidth allocation element; and
   resetting the write pointer to an initial position upon detection of an invalid CRC in the downstream management message.

4. The method of claim 1, wherein the one or more upstream bandwidth allocation elements comprise at least one data grant bandwidth allocation element and at least one data grant pending bandwidth element.

5. The method of claim 4, wherein the method further comprises scheduling an upstream transmission for a bandwidth allocation element associated with a data grant bandwidth allocation element message upon detecting a validation of the CRC.

6. The method of claim 1, wherein the method further comprises storing statistical information derived from the bandwidth allocation elements between the first locations and the subsequent locations.

7. A device comprising:
   logic to receive a downstream management message at a client termination device, the downstream management message comprising one or more bandwidth allocation elements and a cyclic redundancy code (CRC);
   a data buffer to store bandwidth allocation information based upon selected ones of the bandwidth allocation elements;
   logic to output the stored bandwidth allocation information from the buffer in response to detecting a validation of the CRC;
   logic to store message header data in one or more first locations in a first-in-first-out (FIFO) data buffer, the message header data being based upon a message header in the downstream management message;
   logic to store the bandwidth allocation information in subsequent locations in the FIFO data buffer;
   logic to store the message header data in the FIFO data buffer at locations indicated by a write pointer;
   logic to advance the write pointer to one or more of the subsequent locations;

logic to store the bandwidth allocation information in the subsequent locations; and logic to store data in the FIFO data buffer between the first locations and the subsequent locations upon completion of storing the bandwidth allocation information in the subsequent locations.

8. The device of claim 7, the device further comprising:

logic to associate one or more bandwidth allocation elements with the client termination device based upon service identifier information; and logic to store bandwidth allocation information in the data buffer for each bandwidth allocation element associated with the client termination device.

9. The device of claim 7, the device further comprising:

logic to sequentially store bandwidth allocation information for the selected bandwidth allocation elements in a first-in-first-out data buffer at locations indicated by a write pointer;

logic to advance the write pointer after storing bandwidth allocation information for each bandwidth allocation element; and logic to reset the write pointer to an initial position upon detection of an invalid CRC in the downstream management message.

10. The device of claim 7, wherein the one or more bandwidth allocation elements comprise at least one data grant bandwidth allocation element and at least one data grant pending bandwidth allocation element.

11. The device of claim 10, the device further comprising logic to schedule an upstream transmission for a bandwidth allocation element associated with a data grant bandwidth allocation element message upon a validation of the CRC.

12. The device of claim 7, wherein the device further comprises logic to store statistical information derived from the bandwidth allocation elements between the first locations and the subsequent locations.

13. A system comprising:

a host processing system;

a data bus coupled to the host processing system; and a client termination device coupled to the data bus, the client termination device comprising:

a processing circuit; and a receiving circuit comprising:

logic to receive a downstream management message from transmission medium coupled to a client termination device, the downstream management message comprising one or more bandwidth allocation elements and a cyclic redundancy code (CRC);

a data buffer to store bandwidth allocation information based upon selected ones of the bandwidth allocation elements;

logic to output the stored bandwidth allocation information from the data buffer to the processing circuit in response to detecting a validation of the CRC;

logic to store message header data in one or more first locations in a first-in-first-out (FIFO) data buffer, the message header data being based upon a message header in the downstream management message;

logic to store the bandwidth allocation information in subsequent locations in the FIFO data buffer;

logic to store the message header data in the FIFO data buffer at locations indicated by a write pointer;

logic to advance the write pointer to one or more of the subsequent locations;

logic to store the bandwidth allocation information in the subsequent locations; and logic to store data in the FIFO data buffer between the first locations and the subsequent locations upon completion of storing the bandwidth information in the subsequent locations.

14. The system of claim 13, wherein the system further comprises logic to initiate a DMA transaction on the data bus in response to the processing circuit.

15. The system of claim 13, wherein the system further comprises a cable modem termination system coupled to the client termination device by a transmission medium.

16. The system of claim 13, wherein the receiving circuit further comprises:

logic to associate one or more bandwidth allocation elements with the client termination device based upon service identifier information; and logic to store bandwidth allocation information in the data buffer for each bandwidth allocation element associated with the client termination device.

17. The system of claim 13, wherein the receiving circuit further comprises:

logic to sequentially store bandwidth allocation information based upon the selected bandwidth allocation elements in a first-in-first-out data buffer at locations indicated by a write pointer;

logic to advance the write pointer after storing bandwidth allocation information for each bandwidth allocation element; and logic to reset the write pointer to an initial position upon detection of an invalid CRC in the downstream management message.

18. The system of claim 13, wherein the one or more bandwidth allocation elements comprise at least one data grant bandwidth allocation element and at least one data grant pending bandwidth allocation element.

19. The system of claim 18, wherein the receiving circuit further comprises logic to schedule an upstream transmission for each bandwidth allocation element associated with a data grant bandwidth allocation element upon detecting a validation of the CRC.

20. The system of claim 13, wherein the receiving circuit further comprises logic to store statistical information derived from the bandwidth allocation elements between the first locations and the subsequent locations.

21. An apparatus comprising:

means for receiving a downstream management message at a client termination device, the client termination device comprising a data buffer, the downstream management message comprising one or more bandwidth allocation elements and a cyclic redundancy code (CRC);

means for storing bandwidth allocation information based upon selected ones of the bandwidth allocation elements in the data buffer;

means for outputting the stored bandwidth allocation information from the buffer in response to detecting a validation of the CRC;

means for storing message header data in one or more first locations in a first-in-first-out (FIFO) data buffer, the message header data being based upon a message header in the downstream management message;

means for storing the bandwidth allocation information in subsequent locations in the FIFO data buffer;

means for storing the message header data in the FIFO data buffer at locations indicated by a write pointer;

means for advancing the write pointer to one or more of the subsequent locations;

means for storing the bandwidth allocation information in the subsequent locations; and means for upon completion of storing the bandwidth information in the subsequent locations, storing data in the FIFO data buffer between the first locations and the subsequent locations.

22. The apparatus of claim 21, the apparatus further comprising:

means for associating one or more bandwidth allocation elements with the client termination device based upon service identifier information; and means for storing bandwidth allocation information in the data buffer for each bandwidth allocation element associated with the client termination device.

23. The apparatus of claim 21, the apparatus further comprising:

means for sequentially storing bandwidth allocation information based upon one or more bandwidth allocation elements in a first-in-first-out data buffer at locations indicated by a write pointer;

means for advancing the write pointer after storing bandwidth allocation information for each bandwidth allocation message; and means for resetting the write pointer to an initial position upon detection of an invalid CRC in the downstream management message.

24. The apparatus of claim 21, wherein the one or more upstream bandwidth allocation elements comprise at least one data grant bandwidth allocation element and at least one data grant pending bandwidth allocation element.

25. The apparatus of claim 21, wherein the apparatus further comprises means for scheduling an upstream transmission for a bandwidth allocation element associated with a data grant bandwidth allocation element message upon detecting a validation of the CRC.

\* \* \* \* \*